United States Patent [19]

Swanson et al.

[11] Patent Number: 5,427,347

[45] Date of Patent: Jun. 27, 1995

[54] APPARATUS FOR CONTROLLING ACTIVE MOUNTS

[75] Inventors: Douglas A. Swanson, Apex; Lane R. Miller, Fuquay-Varina, both of N.C.

[73] Assignee: Lord Corporation, Erie, Pa.

[21] Appl. No.: 44,851

[22] Filed: Apr. 8, 1993

[51] Int. Cl.⁶ ............................................. F16M 13/00
[52] U.S. Cl. .................................. 248/550; 248/562; 248/638
[58] Field of Search ............... 248/550, 638, 636, 562, 248/634, 619; 267/140.14; 188/267

[56] References Cited

U.S. PATENT DOCUMENTS

| | | |
|---|---|---|
| 2,964,272 | 12/1960 | Olson . |
| 3,566,993 | 3/1971 | Leatherwood et al. . |
| 3,606,233 | 9/1971 | Scharton et al. . |
| 4,600,863 | 7/1986 | Chaplin et al. . |
| 4,624,435 | 11/1986 | Freudenberg ................ 248/550 |
| 4,633,982 | 1/1987 | Swigert . |
| 4,638,983 | 1/1987 | Idigkeit . |
| 4,648,576 | 3/1987 | Matsui ...................... 248/636 X |
| 4,669,711 | 6/1987 | Beer . |
| 4,693,455 | 9/1987 | Andrä . |
| 4,699,348 | 10/1987 | Freudenberg ................ 248/550 |
| 4,700,933 | 10/1987 | Chikamori et al. .......... 248/550 X |
| 4,756,549 | 7/1988 | Kurosawa . |
| 4,762,306 | 8/1988 | Watanabe et al. .......... 248/550 X |
| 4,793,599 | 12/1988 | Ishioka ...................... 248/636 X |
| 4,796,873 | 1/1989 | Schubert . |
| 4,802,648 | 2/1989 | Decker et al. .............. 248/550 X |
| 4,828,234 | 5/1989 | Hoying et al. .............. 248/550 X |
| 4,869,474 | 9/1989 | Best et al. ................. 248/636 X |
| 4,901,986 | 2/1990 | Smith ....................... 248/550 X |
| 5,028,039 | 7/1991 | Sato ......................... 248/636 X |
| 5,052,510 | 10/1991 | Gossman . |
| 5,062,497 | 11/1991 | Ogata ....................... 248/638 X |
| 5,133,527 | 7/1992 | Chen et al. ................. 248/550 |
| 5,174,552 | 12/1992 | Hodgson et al. . |
| 5,238,232 | 8/1993 | Kobayashi et al. .......... 248/550 X |

OTHER PUBLICATIONS

Hodgson, Douglas A., *Frequency-Shaped Control of Active Isolators*, published Oct. 15, 1991.

*Primary Examiner*—Karen J. Chotkowski
*Attorney, Agent, or Firm*—Randall S. Wayland; Richard K. Thomson; James W. Wright

[57] ABSTRACT

An active isolator with a closed-loop feedback control system which uses an actuator in parallel spring relation to a static load spring to control the dynamic vibration transmitted from a vibrating device over a broad band frequency range. A collocated sensor is installed to sense the vibration of the isolated element and is amplified and fed, filtered and amplified again, reversed in sign and fed directly into the actuator. No external synchronizing signal or processor is needed. This simple active control is practical only where the combined series dynamic stiffness of the structure and vibrating body is much less than or much greater than the active mount's dynamic stiffness.

16 Claims, 6 Drawing Sheets

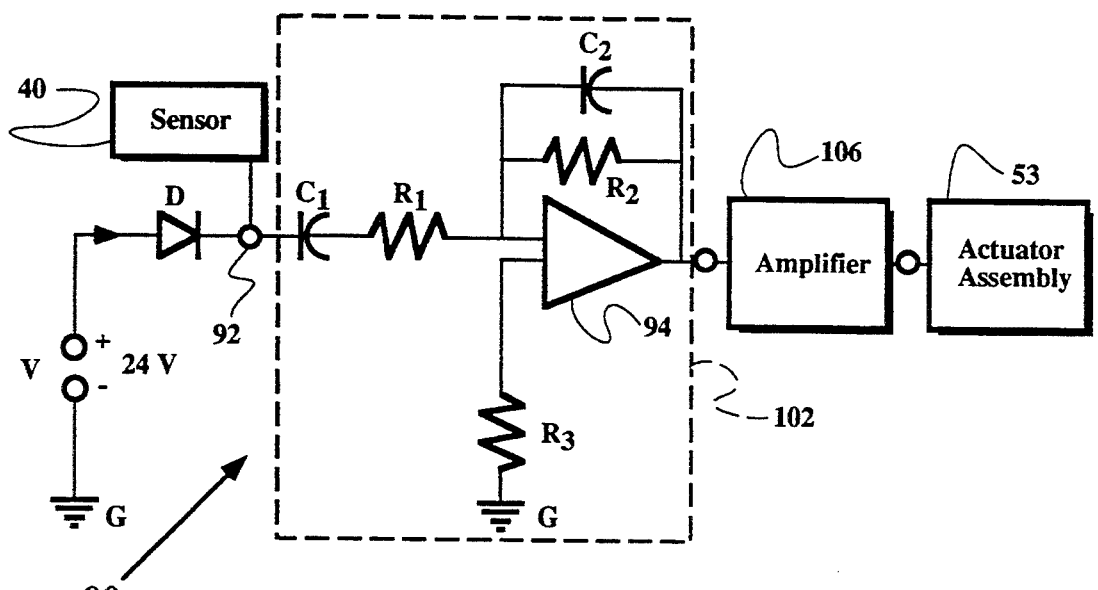
Fig. 7
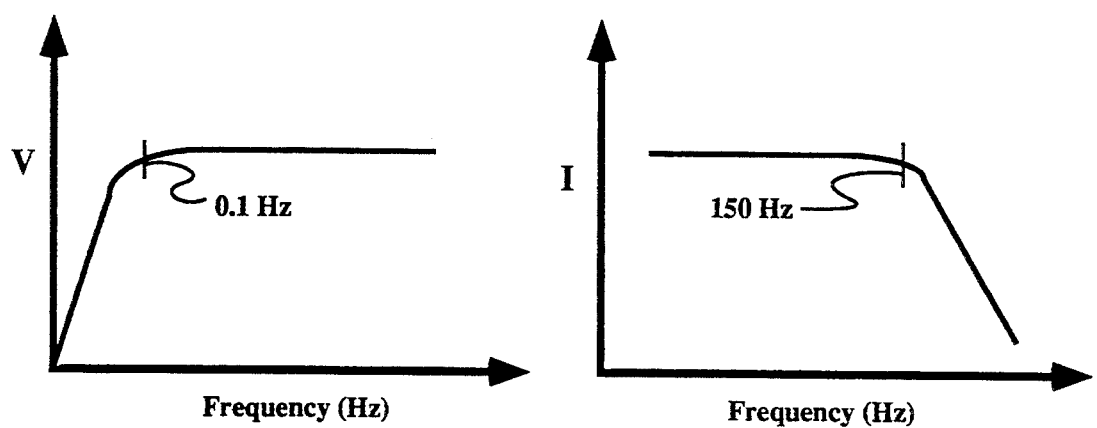
Fig. 8A  Fig. 8B

APPARATUS FOR CONTROLLING ACTIVE MOUNTS

FIELD OF THE INVENTION

This invention relates to the area of mounts for isolation of vibration transmitted between a vibrating device and a support. Specifically, the invention relates to the apparatus for controlling active mounts.

BACKGROUND OF THE INVENTION

Generally, active mounts are known which include a spring element and an incorporated powered actuator. In these devices, an input signal from a sensor is processed and then fed to a powered actuator to control the vibrational dynamics between a support and a vibrating body with the goal of reducing the vibration transmitted from the vibrating body to the support. Such active systems are taught in U.S. Pat. No. 2,964,272 to Olsen, U.S. Pat. No. 3,566,993 to Leatherwood, U.S. Pat. No. 4,796,873 to Schubert, U.S. Pat. No. 5,052,510 to Gossman, and U.S. Pat. No. 5,067,684 to Garnjost. These systems are useful for adding dynamic forces at various operating frequencies and can effectively cancel vibration emanating from a vibrating device, such that little or no vibration is transmitted. Many types of actuators have been developed for these active mountings as exemplified by U.S. Pat. No. 4,600,863 to Chaplin et al., U.S. Pat. No. 4,669,711 to Beer, U.S. Pat. No. 4,693,455 to Andra, and U.S. Pat. No. 4,699,348 to Freudenburg.

The concerns regarding the implementation of active mounts have revolved around system stability and isolator effectiveness. The conventional approach has been to take a signal indicative of motion from a support that is desired to be isolated from a vibrating device. This signal is then minimized via a control algorithm such as Least Mean Square (LMS), frequency-shaped control, or H-infinity control. However, in order to design the control system, the dynamics of the structure, and in some cases the dynamics the vibrating element must be known fairly precisely. In systems using these control signals to accommodate multiple resonant frequencies in the control band width, the algorithm and the electronics required to provide proper control become extremely complicated and expensive. With active mounts installed in vibrationally dense or modally dense environments, adding energy to the active mount at a frequency which coincides with one of these modes of the engine or support, can cause the system to become unstable and, rather than improving vibration isolation, can diminish it. Thus for these dynamically dense systems, it is important to determine and account for these modes.

The prior art devices have attempted to recognize these modes and, either, avoid imparting energy at those resonant frequencies or, implement a control system which in some way accommodates for these modes of vibration through proper phasing of input forces. The problem with these "state of the art" methods is that they become exceedingly complex when trying to account for the vibrational modes of the structure and the vibrational modes of the, source. In order to accommodate this type of control and its complexity, controllers containing complicated processors have evolved.

Although these complicated processors may be warranted in some applications, in others, they are impractical and cost prohibitive. Other prior art devices have attempted to simplify the complexity. U.S. Pat. No. 4,638,983 to Indigkeit et al. describes one such device wherein an active mount 1 includes a liquid filled hollow space, whereby the fluid is moved by a positioning element 11 which is actively controlled by a control unit 14. In Indigkeit et al. '983, a sync signal is utilized to establish the frequency of operation. Another such device is taught in U.S. Pat. No. 5,133,527 to Chen et al. wherein an active mount takes a signal from a sensor 10, processes it and synchronizes it with a tachometer signal. However, in many applications, the cost and complexity of these controllers using sync signals cannot be tolerated. Further, such tonal controllers as taught by Indigkeit et al. and Chen et al. would be incapable of producing meaningful results with a broad band vibrational disturbance. Therefore, there is a need for a cost effective and efficient active isolator capable of broad band vibration isolation.

U.S. Pat. No. 5,011,108 to Chen et al. describes an active mount where a transducer senses force acting on the mount and the signal is processed, passed through a band pass filter and then through a series of adjustable gain amplifiers and, finally, into an electromagnet. However, despite the apparent simplicity, the device is still too complicated for some applications and is constrained by the fact that there must be alignment between the magnet and the coil for proper functioning.

SUMMARY OF THE INVENTION

In light of the advantages and shortcomings of the related active mounts, the present invention provides an active mount and control system for reducing the mechanical vibration level transmitted from the vibrating device to a support which is very simple and cost effective, which can be used to effectuate broad band isolation when certain dynamic stiffness criteria are met in relation to the dynamic stiffness of the mount, the dynamic stiffness of the support structure, and the dynamic stiffness of the vibrating device.

The present invention provides an active isolator with a collocated sensor and a simple closed-loop feedback control which does not require a synchronizing signal or complicated and expensive controller. In the simplest case, the feedback controller can use all analog components and can be integrated into the mount.

It is a feature of the instant invention to provide an active mount exhibiting an uncontrolled, frequency-dependent dynamic stiffness, $K_M(\Omega)$, for reducing mechanical vibration transmitted from a vibrating device exhibiting a frequency-dependent dynamic stiffness, $K_E(\Omega)$, to a support exhibiting a frequency-dependent dynamic stiffness, $K_S(\Omega)$. Each of these stiffnesses will vary with the frequency, $\Omega$, to which the respective element is subjected. The mount includes a spring means interconnecting said vibrating device and said support for providing passive support of a static load from said vibrating device, an actuator for providing phased dynamic loads to counteract said mechanical vibration from said vibrating device and reduce vibration transmitted to said support, said actuator connected in parallel spring relation to said spring means. The apparatus also includes a sensor collocated with said active mount for supplying an input signal indicative of the condition of said support to a closed-loop feedback control system, which provides an output control signal to said actuator responsive to said sensor.

The mechanical system, which includes the vibrating device, the mount and the support, has a ratio of series dynamic stiffness $K_{SD}(\Omega)$ to elemental dynamic stiffness, $K_X(\Omega)$, related by the expression $K_{SD}(\Omega)/K_X(\Omega) \geq 2$ for $\Omega \geq 2f_n$, where $K_X(\Omega)$ is selected from the group consisting of $K_M(\Omega)$ and $K_S(\Omega)$, $K_{SD}(\Omega) = K_Y(\Omega)K_Z(\Omega)/K_Y(\Omega)+K_Z(\Omega))$ with $K_Y(\Omega)$ and $K_Z(\Omega)$ being the remaining two dynamic stiffnesses from a group consisting of $K_E(\Omega)$, $K_M(\Omega)$ and $K_S(\Omega)$ after $K_X(\Omega)$ is designated, and fn is the first natural frequency of the vibrating device and the mount. In other words, when the dynamic stiffness of the mount $K_M(\Omega)$ or the dynamic stiffness of the structure $K_S(\Omega)$ are much softer than the series dynamic stiffness $K_{SD}(\Omega)$ of the remaining elements, the simple closed-loop feedback control of the present invention may be used.

In these situations the plant transfer function, which comprises the dynamics of every component of the active mount system except the compensator filter, simplifies such that very inexpensive control can be achieved. In the very simplest case, a voice coil actuator is used and only a signal conditioner is needed for the sensor signal, the low pass filter being made unnecessary by properly sizing the voice coil actuator to have an inductive drop-off at the appropriate frequency. Furthermore, by incorporating fluid within the mount and using the voice coil actuator as a dynamic pulsator acting on the fluid, the misalignment problems associated with the prior art are solved.

The above mentioned and further features and advantages of the present invention will become apparent from the accompanying descriptions of the preferred embodiment and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

FIG. 7 is a circuit diagram illustrating a simple analog system for control of the active mount;

FIG. 8A is a plot illustrating the high pass filter characteristics of the signal conditioner; and FIG. 8B is a plot illustrating the low pass filter characteristics of the voice coil.

DETAILED DESCRIPTION OF THE INVENTION

Figure 1A:
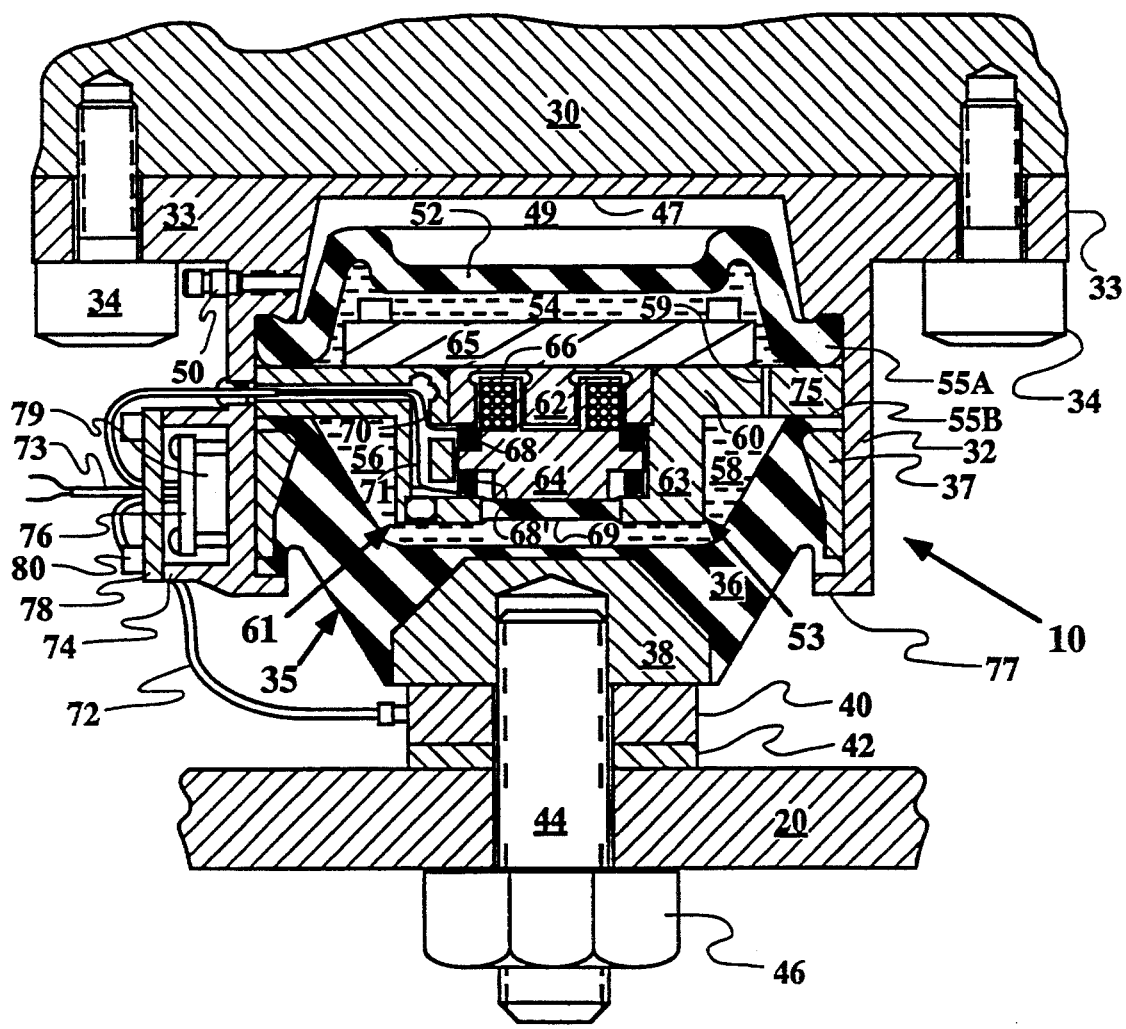
FIG. 1A is a side sectional view of a first embodiment of active mount shown installed.

FIG. 1A depicts a first embodiment of an active mount 10. The mount 10 is shown interconnecting a support 20 such as a vehicle frame and a vibrating device 30, such as a vehicle engine. It will be understood that the terms support and structure are used interchangeably throughout the specification. Mount 10 has an uncontrolled, frequency-dependent dynamic stiffness, $K_M(\Omega)$; support 20 has a frequency-dependent dynamic stiffness $K_S(\Omega)$; and engine 30 has a frequency-dependent dynamic stiffness $K_E(\Omega)$. Each of these dynamic stiffnesses vary with the frequency $\Omega$ to which it is exposed. It should be noted that in some circumstances frequency-dependent dynamic stiffness $K_S(\Omega)$ may have an instantaneous value approaching zero. Accordingly, $K_S(\Omega)$ will normally be measured, for example, by an FFT analyzer, having a frequency resolution in the range of between 1 and 5 hz., depending on band width. This will provide an average non-zero value for $K_S(\Omega)$. The importance of this will become clear shortly.

The mount 10 includes a housing 32 with flanges 33 attached to vibrating device 30 by fasteners 34. The housing 32 could alternatively be attached to the support 20 to be isolated. An elastomer spring 36 is bonded to a cylindrically shaped outer member 37 and to conically shaped inner member 38 by conventional bonding techniques forming spring assembly 35. The elastomer used in spring 36 is preferably a low damped natural rubber, a natural blend, or the like. A sensor 40 is collocated adjacent the mount 10 on the support 20 to be isolated. It is important that the sensor 40 be collocated on or near the element intended to be isolated in order to make it possible for the dynamics of the isolated structure to not be picked up by the sensor, just those of the mount 10.

In this embodiment, the sensor 40 may, for example, be a piezoelectric force-detecting ring type, model 9104 manufactured by Kistler. Other types of force sensors 40 can be used as well. The sensor 40 is attached between the support 20 and the inner member 38 and may include a washer 42 to help uniformly load the sensor 40. The nut 46 is tightened onto stud 44 to compress the sensor 40 against inner member 38. The opposite end of stud 44 is threadably received in member 38. In operation, when a vibratory load is applied to the vibrating device 30, the sensor 40 generates a signal indicative of the dynamic force exerted on the mount 10.

A recess 47 in housing 32 accepts a diaphragm 52 and forms air chamber 48. A valve 50 allows air chamber 48 to be pressurized to a desired level. An actuator assembly 53 is also at least partially received within said recess 47. A valve (not shown) identical to valve 50 is provided to permit the pressurization of the cavity within actuator 53. The assembly 53 is held in place by seals 55a on diaphragm 52 and seal 55b on spring assembly 35 and effectively forms a divider 60 between first variable volume fluid chamber 54 and second variable volume fluid chamber 56. A fluid 58 such as silicone oil, glycol, or the like is contained within said first variable volume fluid chamber 54 and second variable volume fluid chamber 56. The assembly can be submerged filled or vacuum filled and plugged as is known to those skilled in the art. The spring assembly 35 is secured in place by crimp 77 which compresses seals 55A and 55B and secures divider 60 against shoulder 67.

A passage 59 is formed in divider 60 and connects first variable volume fluid chamber 54 and second variable volume fluid chamber 56 and allows fluid 58 to flow statically between the chambers 54 and 56 when a static axial force is applied to the mount 10 and the inner member 38 deflects relative to housing 32. The passage is approximately 0.05 inch or smaller in diameter in order to dynamically lock out fluid flow above about 1 hz. Therefore, there are no fluid inertia effects to compensate for in the control of the active mount 10 as would be the case if an inertia track were used. In addition, the ]passage 59 allows fluid to flow from the second variable volume fluid chamber 56 into the first variable volume fluid chamber when the mount 10 is exposed to elevated temperatures. In essence the first variable volume chamber 54 acts as an expansion chamber because of the low volume stiffness of approximately 5 psi/cubic inch. The second variable volume fluid chamber acts as a pulse transfer chamber to transfer the dynamic pulses from the actuator assembly 53 to the inner member 38.

Within the actuator assembly 53 is located the actuator 61 which is comprised of a magnet 62, a spool 64 and a coil 66. The magnet 62 is made of powdered metal construction and is a composite of Samarium Cobalt and Nylon and is manufactured by Kimco Division of BEI Motion Systems in San Marcos, Calif. The spool 64 is light in weight and nonmagnetic, preferably made of plastic such as Ryton PPS made by Phillips 66 Company of Bartlesville, Okla. The spool 64 and magnet 62 are inserted in actuator housing 63 and sealed by cover 65 using o-ring seals (not shown) or any other known sealant. There is no fluid within the actuator assembly 53. The spool 64 is wrapped with copper wire to form coil 66. Current from the feedback system is transferred to the coil 66 through one spring 68 from coil lead 70 which connects closed-loop feedback controller 76 to a washer (not shown), with a return flow path through second spring 68', another washer (not shown) and coil lead 71. These springs 68 allow the coil 66 and spool 64 to oscillate relative to one another without fatiguing coil leads 70, 71. The use of this type of electrical connector system is taught in the commonly assigned application 07/914,248 filed Jul. 15, 1992, hereby incorporated by reference which is now matured into U.S. Pat. No. 5,323,133

As a current or voltage is supplied to the coil 66, it is actuated in space axially relative to the magnet 62 and flexes bladder 69 to create a pressure pulse within the second variable volume fluid chamber 56. This actuator force is reacted by the reaction plate 75. This pressure pulse is properly phased in relation to the vibration of the vibrating device 30 in order to effectively cancel the vibration emanating therefrom. Note, the fluid is not throttled through the passage as this leads to problems of accounting for the fluid dynamics through more sophisticated circuitry. Upon sensing any vibration, the feedback controller 76 will actuate the actuator 61 to input phased forces and the support 20 will experience little or no vibration over a broad frequency range of from a frequency $\Omega$ of approximately the system natural frequency $f_n$ to about 200 hz. The signal input from the sensor 40 is fed through lead 72 into feedback controller 76. A power lead 73 provides the active mount 10 with DC power of 12 or 28 volts DC, by way of example.

The closed-loop feedback controller 76 is housed within a recess 74 within housing 32 or can be elsewhere integrated into the mount 10 design. A cover plate 78 closes and seals the components within recess 74 via fasteners 80 and protects them from environmental corrosion. Potting material 79 can be placed in recess 74 for further protection. This type of mounting 10 is used when the active mount, frequency-dependent dynamic stiffness $K_M(\Omega)$ is much softer than the series dynamic stiffness $K_{SD}(\Omega)$, where $K_{SD}(\Omega) = K_S(\Omega) K_E(\Omega)/[K_S(\Omega) + K_E(\Omega)]$. Such a condition can be said to exist when $K_{SD}(\Omega)/K_M(\Omega)$ is $\geq 2$, where the frequency $\Omega$ is $>2f_n$.

Figure 1B:
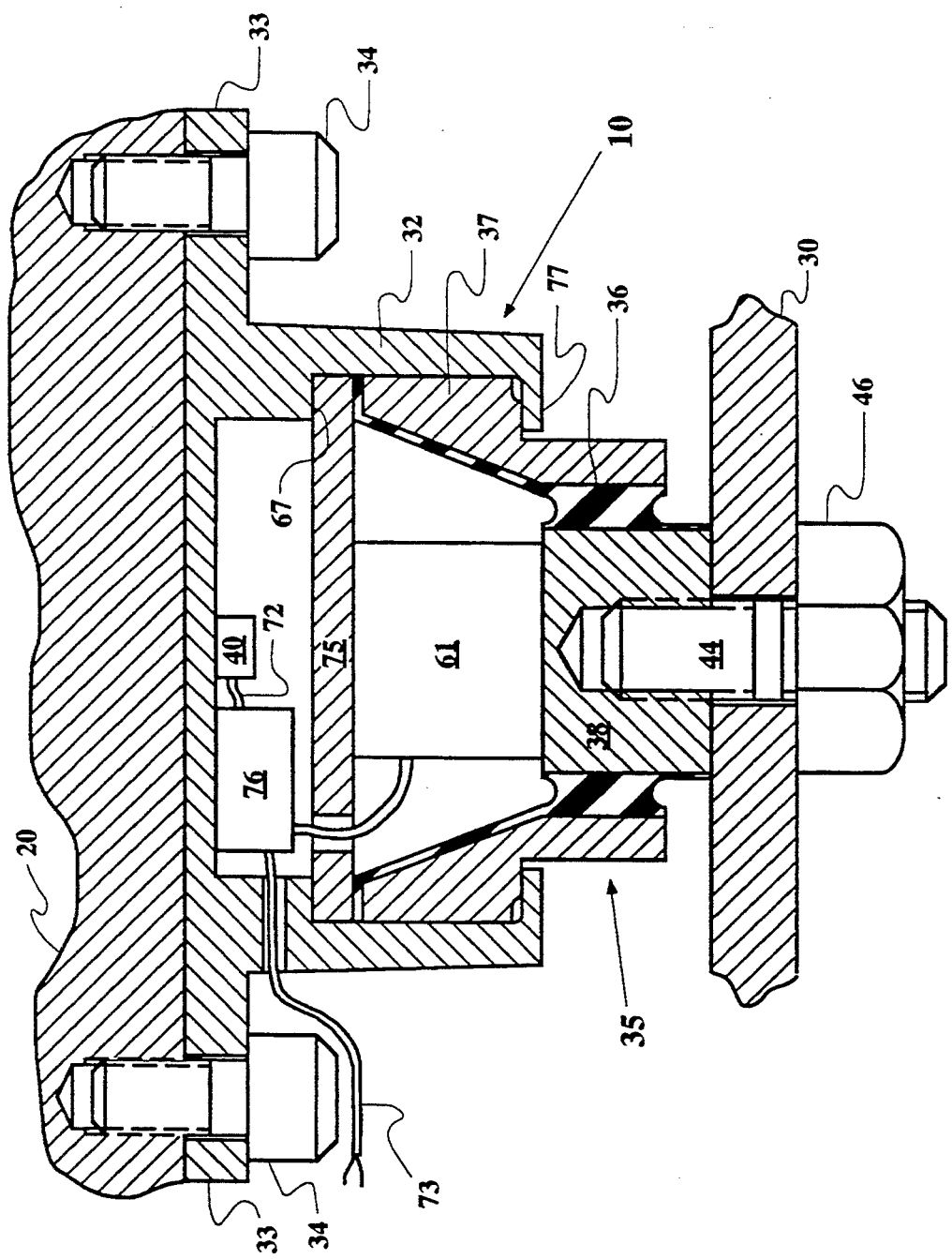
FIG. 1B is a side sectional view of a second embodiment of the active mount shown installed.

FIG. 1B illustrates another embodiment of active mount 10 which includes an actuator 61 of the piezoelectric type. This device is similar to the device in FIG. 1A in that it allows the use of a simple and cost effective closed loop feedback system. However, the axial stiffness of this mount 10 is much stiffer than the FIG. 1A device. This is because the actuator 61 is connected in parallel spring relation to the elastomer spring 36. In essence, the elastomer spring 36 functions to allow the very small axial oscillations of the actuator 61 and yet restrains cocking and torsional motions from being imparted to the actuator 61. Generally, the elastomer spring 36 needs to be soft axially and stiff in cocking and torsion to avoid loading the actuator 61 improperly. In this device, there is no fluid contained in the mounting. However, it could be added if desired.

In the operation of this second embodiment, the sensor 40 sends a signal indicative of the motion of the support 20 to the closed-loop feedback controller 76 which in turn sends a voltage signal to the actuator 61 causing the actuator to react to try and minimize the vibration of the support 20. In this case, the sensor 40 is an accelerometer. The mount 10 is assembled by inserting reaction plate 75 into housing 32 till it abuts shoulder 67. Then the spring assembly 35 is inserted into housing till it abuts reaction plate 75. The assembly is then permanently clamped together via crimp 77. This particular type of mount 10 is used in a scenario where the dynamic stiffness $K_S(\Omega)$ of the structure is much softer than the series dynamic stiffness $K_{SD}(\Omega)$ of the mechanical system where $K_{SD}(\Omega) = K_M(\Omega) K_E(\Omega)/[K_M(\Omega) + K_E(\Omega)]$. Such a situation can be said to exist when the ratio $K_{SD}(\Omega)/K_S(\Omega) \geq 2$, where the frequency $\Omega > 2f_n$.

It should be apparent that there are significant similarities between the operational characteristics of the first embodiment of FIG. 1A and those of the second embodiment shown in FIG. 1B. In fact, the two expressions can be commonly stated by assigning generic elemental dynamic stiffnesses, $K_X(\Omega)$, $K_Y(\Omega)$ and $K_Z(\Omega)$ to the members of the mechanical system which include the mount, the support and the vibration source. The common expression then becomes, $K_{SD}(\Omega)/K_X(\Omega) \geq 2$ for $\Omega \geq 2f_n$, where $K_X(\Omega)$ is selected from the group consisting of $K_M(\Omega)$ and $K_S(\Omega)$, and $K_{SD}(\Omega) = K_Y(\Omega) K_Z(\Omega)/[K_Y(\Omega) + K_Z(\Omega)]$ with $K_Y(\Omega)$ and $K_Z(\Omega)$ being the remaining two dynamic stiffnesses from a group consisting of $K_E(\Omega)$, $K_M(\Omega)$ and $K_S(\Omega)$ after $K_X(\Omega)$ has been designated. Simple substitutions of $K_M(\Omega)$ and $K_S(\Omega)$ for $K_X(\Omega)$ will demonstrate the validity of this common denominator for the first and second embodiments.

Figure 2:
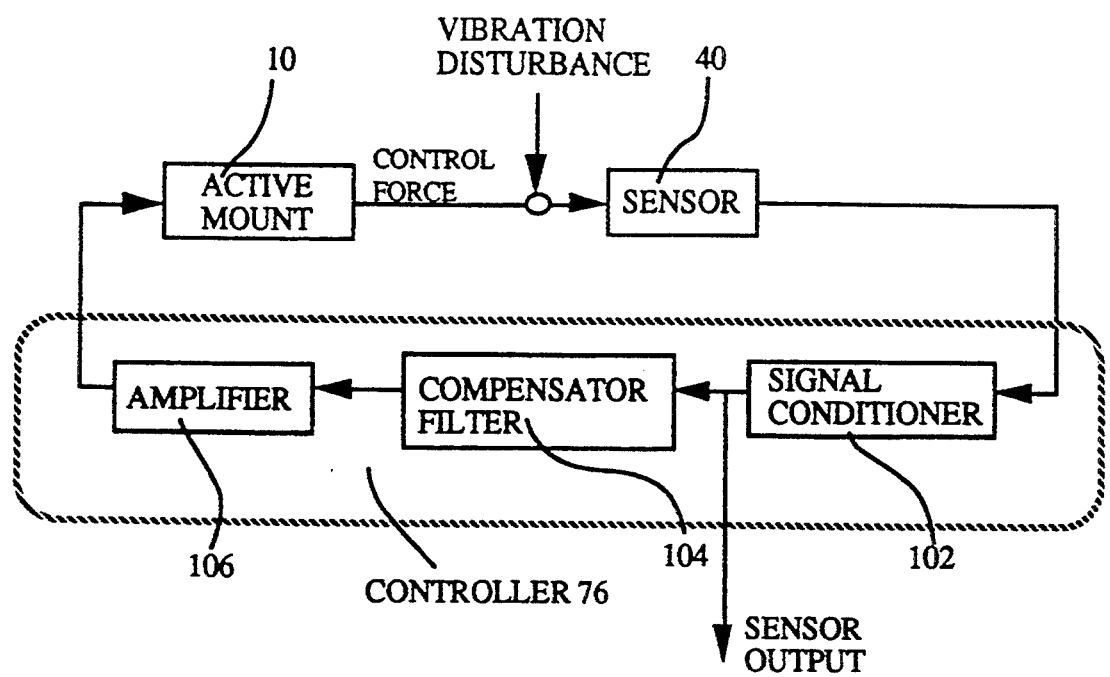
FIG. 2 is a block diagram illustrating a feedback closed-loop controller.

FIG. 2 is a block diagram which illustrates one embodiment of a closed-loop feedback system used to control the active mount devices illustrated in FIG. 1A and FIG. 1B. The components of the active mounting system are the active mount 10, the sensor 40, and the controller 76. The controller 76 consists of an amplifier 106, a signal conditioner 102, and a compensator filter 104. The closed loop feedback system operates as follows. The sensor 40, which can be either a force sensor or a motion sensor, such as an LVDT, accelerometer or voice coil, picks up vibration that is generated by the vibrating device 30. The signal conditioner 102 which may, for example be a 1/10 hz high pass filter, amplifies and high pass filters the signal of sensor 40. The output of the signal conditioner 102 is fed back to compensator filter 104, which implements the control algorithm. The compensator filter 104 can vary in complexity depending on the dynamics of the active mount. A simple first embodiment uses a low pass filter 104 that allows low frequencies to pass and has a knee at a frequency above which control is not needed, e.g., 200 hz. The output of the low pass filter 104 is then sent to the amplifier 106, which boosts the low level output of the low pass filter 104 and drives the actuator 61 located in the active mount 10. The active mount 10 then produces control forces that counteract the vibration generated by the engine 30, reducing the magnitude of the disturbance detected by sensor 40. In one system tested the natural frequency $f_n$ is 15 hz. By definition, $f_n$ is define as $$\frac{1}{2\pi} \sqrt{\frac{K'_M}{M_E}}$$

where $K'_M$ is $K_M(\Omega)$ for $\Omega=0$ and $M_E$ is the mass of the engine.

As is well known to someone skilled in the art, the design of the compensator filter 104 depends on the plant transfer function, which represents the dynamics of every component of the active mounting system except for the compensator filter 104. The plant transfer function is measured experimentally by relating an input voltage of the amplifier 106 to the output voltage of the signal conditioner 102, when no disturbance is present. The plant transfer function encompasses the dynamics of the active mount 10, the support structure 20, the vibrating device 30, the sensor 40, the amplifier 106, and the signal conditioner 102.

It is well known that if the plant transfer function is a complicated function of frequency, then the compensating filter 104 must also be a complicated function of frequency to achieve vibration reductions over a broad frequency range. If the vibrating device 30 and support structure 20 contain many lightly damped resonances in the frequency range of interest, then the plant transfer function can potentially be a complicated function of frequency.

It is an essential feature of this invention that, when the conditions mentioned earlier are satisfied, i.e., when either the mount stiffness or the structural stiffness are much softer than the series dynamic stiffness of the mechanical system, the plant transfer function will maintain a very simple form that does not contain the many lightly damped resonances of the vibrating device 30 and support structure 20. A very simple compensating filter 104 can then be designed which achieves significant broadband reductions in vibration.

Figure 3:
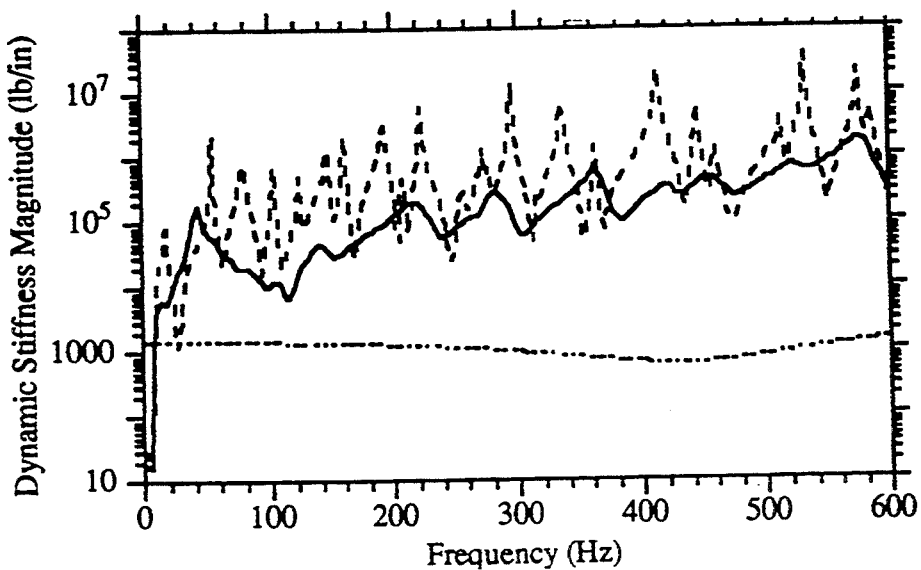
FIG. 3 is a plot illustrating the dynamic stiffnesses of a typical engine, structure, and mount where $K_M(\Omega) << K_E(\Omega)K_S(\Omega)/[K_E(\Omega)+K_S(\Omega)]$ with $\Omega > 2 f_n$, with $f_n$ being, e.g., 15 hz.
Figure 4:
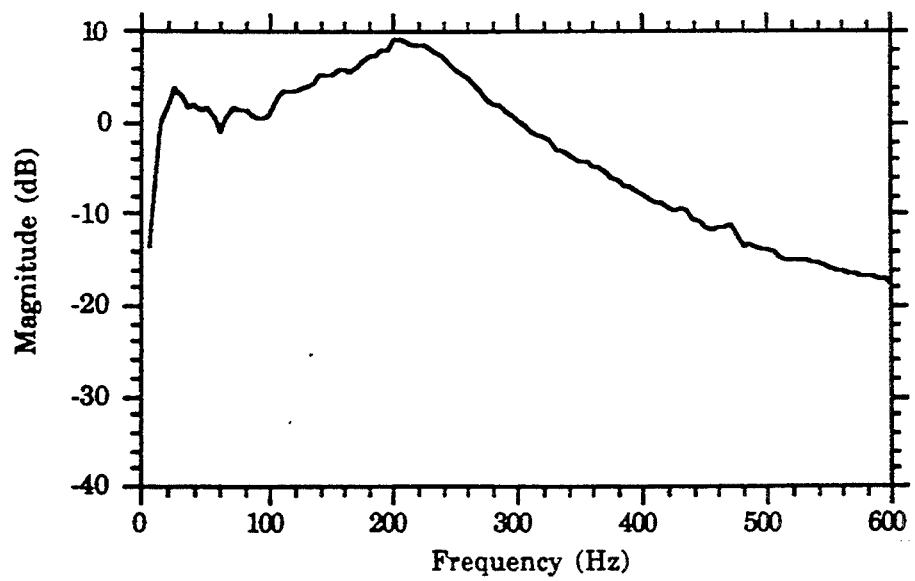
FIG. 4 is an exemplary plot of the plant transfer function for a simple case.

These concepts are best illustrated using FIGS. 3 and 4. FIG. 3 illustrates the dynamic stiffnesses of a vibrating device 30, a support structure 20, and active mount 10 versus frequency for a test system at a single mount location. The vibrating element 30 in the test system was supported by four active mounts 10. In this system, the mount 10 is substantially softer than the series dynamic stiffness of the vibration device 30 and the support structure 20. Also, both the vibrating device 30 and the support structure 20 contain many lightly damped resonances in the control bandwidth, which was from $f_n$ (e.g., 15 Hz) to 200 Hz.

The plant transfer function for this system is shown in FIG. 4. The plant transfer function does not contain the many lightly damped resonances of the vibrating element 30 and support structure 10. The plant transfer function only contains the low order dynamics of the mount 10. This results in a very simple, low cost compensator filter 104.

Figure 5:
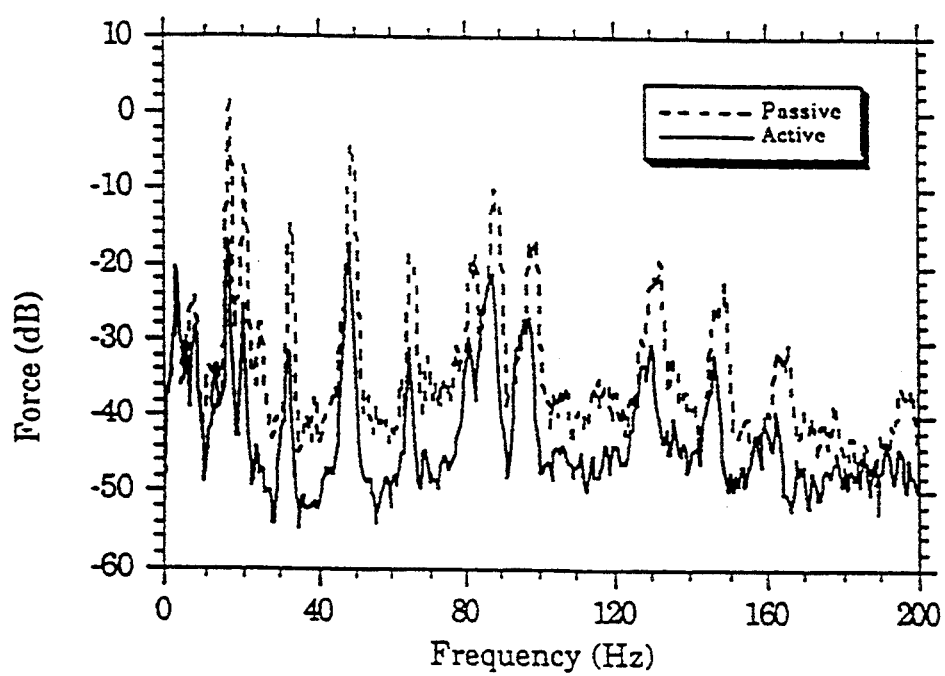
FIG. 5 is a plot illustrating a broad-band reduction in transmitted force as compared to a passively mounted system.

FIG. 5 illustrates the performance of the actively mounted system versus a passively mounted system and demonstrating broad band reductions in transmitted force between $f_n$ and 200 hz. Broad band reduction occurs at both the peaks and the valleys for the active mounts 10. The system used comprised a four point mounting system. Each mounting exhibited a mounting axial stiffness of approximately 1500 lb/in. The mounts were the voice coil activated type and required 2 watts RMS each to drive them. They operated off a 15 maximum DC volt source. Using the mount configuration in FIG. 1A, the mounts 10 provide active isolation along the axial axis, and in addition, they also provide passive isolation laterally. In summary, the abovementioned active mounts 10 provide excellent broad band isolation for use in selected dynamic systems for controlling vibration above the natural frequency, $f_n$. This allows the control scheme to be simple and cost effective, and require only small amounts of DC power. The reason no attempt is made to control vibration below $f_n$ is so that the mount is not made so soft as to produce undue low frequency (0 to $f_n$) engine motion.

Figure 6:
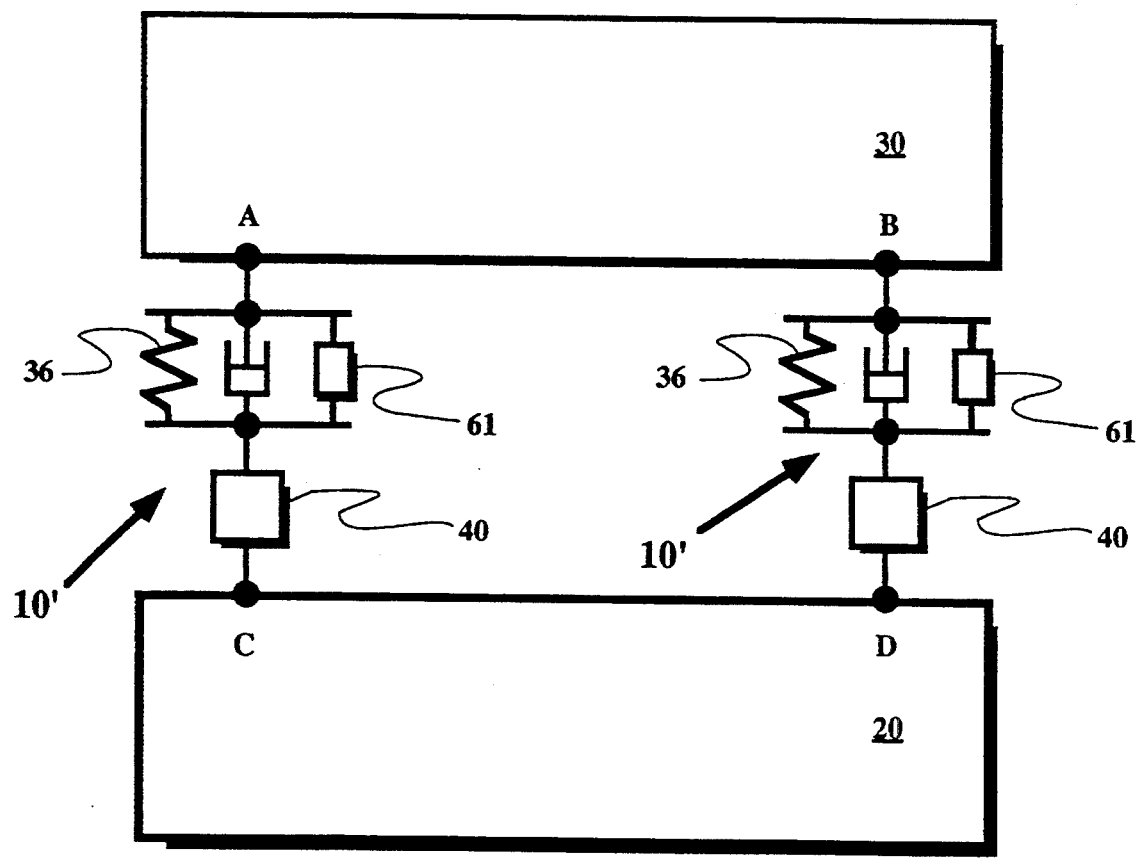
FIG. 6 is a schematic diagram illustrating the use of multiple active mounts.

FIG. 6 illustrates the installation of the active mounts 10' and 10" within a system including a vibrating device 30 and a support 20. The sensors 40 are collocated with the mounts 10' and 10" nearest the support 20. A pair of mounts 10' and 10" which are similar to that described in FIG. 1A are installed where the dynamic stiffnesses $K_M(\Omega)$ of the mounts are much softer than the series dynamic stiffness $K_{SD}(\Omega)$ of the support 20 $K_S(\Omega)$ at C and D and the dynamic stiffness $K_E(\Omega)$ of the vibrating device 30 at A and B, i.e., when: $K_M(\Omega) << K_E(\Omega)K_S(\Omega)/[K_S(\Omega)+K_E(\Omega)]$.

Alternatively, mounts 10' and 10" which are similar to that described in FIG. 1B are installed where the dynamic stiffness $K_S(\Omega)$ of the support at C and D is much softer than the series dynamic stiffness $K_{SD}(\Omega)$ of the active mounts 10' and 10" $K_M(\Omega)$ and the dynamic stiffness of the vibrating device $K_E(\Omega)$ at A and B, i.e., when: $K_S(\Omega) << K_M(\Omega)K_E(\Omega)/[K_M(\Omega)+K_E(\Omega)]$. Note the actuator 61 and the elastomeric spring 36 are in parallel spring relation. The elastomer spring 36 is shown having a real component and a hysteretic component.

FIG. 7 illustrates a very simple analog circuit 90 for use with the present invention. By using this circuit, the need for a controller 76, compensator, or low pass filter is eliminated, making an extremely low cost and effective dosed-loop feedback system. The key is to operate an amplifier 106, such as a Techron model 7540, in a constant voltage mode rather than a constant current mode. Such an amplifier is preferably used in combination with an actuator 53 of the voice-coil type. Because the voice coil can be designed to have an inductive roll-off frequency of between 150–500 hz, the low pass filter required by the prior art can be eliminated. The circuit 90 was designed for a 24 volt DC source V, but other sources, such as 12 volt circuits, would work also. The current is then fed through a diode D to take out any voltage spikes. The signal from the sensor 40 is fed in at junction 92 and then into signal conditioner 102. The signal conditioner 102 contains capacitors $C_1$ of 11 micro farads and $C_2$ of 50 pica farads. It also contains resistors $R_1$, $R_2$, and $R_3$ having resistance values of 7.5K ohms, 750K ohms, and 750K ohms, respectively, and an operational amplifier 94. The signal from the signal conditioner 102 is fed into amplifier 106 and then the amplified signal is then fed into the actuator assembly 53.

FIG. 8A illustrators the type of characteristics provided by the signal conditioner 102. The conditioner 102 allows high frequency components above 0.1 hz to pass.

FIG. 8B illustrates the type of characteristics provided a voice coil actuator 53. The voice coil allows the elimination of the filter because of the inductive drop-off that can be tuned between 150–500 hz. through selection of the geometry of the components of the coil.

Various changes, alterations, and modifications will become apparent to one of ordinary skill in the art after a reading of the foregoing specification. It is intended that all such changes, alterations and modifications as fall within the scope of the appended claims be considered part of the present invention.

What is claimed is:

1. An active mount exhibiting an uncontrolled, frequency-dependent dynamic stiffness $K_M(\Omega)$ for reducing mechanical vibration transmitted within a mechanical system which includes said mount, a vibrating device exhibiting a frequency-dependent dynamic stiffness $K_E(\Omega)$ and a support exhibiting a frequency-dependent dynamic stiffness $K_S(\Omega)$, comprising:

(a) spring means interconnecting said vibrating device and said support for providing passive support of a static load from said vibrating device;

(b) an actuator for providing phased dynamic loads to counteract said mechanical vibration from said vibrating device and reduce vibration transmitted to said support, said actuator connected in parallel spring relation to said spring means;

(c) a sensor collocated with said active mount for supplying an input signal to a simple closed-loop feedback control system;

(d) said closed-loop feedback control system providing an output control signal to said actuator responsive to said collocated sensor and further including an amplifier which amplifies said input signal, and means for reversing the sign of said input signal; and, (e) said mechanical system having a natural frequency $f_n$, said mechanical system being characterized by a ratio of a series dynamic stiffness $K_{SD}(\Omega)$ to an elemental dynamic stiffness. $K_X(\Omega)$, being related by an expression $$K_{SD}(\Omega)/K_X(\Omega) \geq 2 \text{ for } \Omega \geq 2f_n$$

where $K_X(\Omega)$ is selected from the group consisting of $K_M(\Omega)$ and $K_S(\Omega)$ and $D_{SD}(\Omega) = K_Y(\Omega)K_Z(\Omega)/[K_Y(\Omega)+K_Z(\Omega)]$ with $K_Y(\Omega)$ and $K_Z(\Omega)$ being a remaining two dynamic stiffness from a group consisting of $K_E(\Omega)$, $K_M(\Omega)$ and $K_S(\Omega)$ after $K_X(\Omega)$ has been designated, such that $K_X(\Omega)$ is much softer than $K_{SD}(\Omega)$ enabling the use of said simple closed-loop feedback control.

2. The active mount in accordance with claim 1 wherein said amplifier, and said means for reversing the sign of said input signal are integrated into said active mount.

3. The active mount in accordance with claim 1 further comprising a low pass filter.

4. The active mount in accordance with claim 3 wherein said low pass filter has a roll off at about 200 hz.

5. The active mount in accordance with claim 4 wherein said low pass filter has a roll off at about 80 hz.

6. The active mount in accordance with claim 1 wherein said spring means is elastomeric, said actuator is electromechanical and contained within said active mount.

7. The active mount in accordance with claim 6 which further includes a fluid passage for allowing fluid compensation but which does not allow fluid to pass dynamically above a predetermined minimum frequency.

8. The active fluid mount in accordance with claim 7 wherein said predetermined frequency is about 1 hz.

9. The active mount in accordance with claim 1 wherein said actuator is selected from the group containing piezoelectric, magnetostrictive and voice coil.

10. The active mount in accordance with claim 1 which further includes a filter for filtering said input signal.

11. The active mount in accordance with claim 1 wherein said sensor is selected from the group containing accelerometer, LVDT, voice coil, force sensor.

12. The active mount in accordance with claim 1 which further includes a first variable volume fluid chamber and a second variable volume fluid chamber interconnected by a fluid passage which allows fluid flow for static load accommodation and volume compensation, but dynamically locks up for frequencies above a predetermined design frequency.

13. The active mount in accordance with claim 12 wherein said predetermined design frequency is substantially below natural frequency of said system.

14. The active mount in accordance with claim 1 wherein said actuator is of the voice coil type having an inductive drop-off in the range of between 150 and 500 hz.

15. An active mount exhibiting an uncontrolled frequency-dependent dynamic stiffness $K_M(\Omega)$ for reducing mechanical vibration transmitted within a mechanical system which includes said mount, a vibrating device exhibiting a frequency-dependent dynamic stiffness $K_E(\Omega)$ and a support exhibiting a frequency-dependent dynamic stiffness $K_S(\Omega)$, comprising:

(a) a spring means interconnecting said vibrating device and said support for providing passive support of a static load from said vibrating device;

(b) an actuator for providing phased dynamic loads to counteract said mechanical vibration from said vibrating device and reduce vibration transmitted to said support, said actuator connected in parallel spring relation to said spring means;

(c) a force sensor collocated with said active mount for supplying an input signal indicative of a magnitude of a force experienced by said support to a simple closed-loop feedback control system;

(d) said closed-loop feedback control system providing an output control signal to said actuator responsive to said collocated sensor and further including an amplifier which amplifies said input signal, and means for reversing the sign of said input signal; and, (e) said mechanical system having a natural frequency $f_n$ and being characterized by a ratio of series dynamic stiffness $K_{SD}(\Omega)$ to mount stiffness $K_M(\Omega) \geq 2$ for $\Omega \geq 2f_n$, where $K_{SD}(\Omega) = K_E(\Omega)K_S(\Omega)/[K_E(\Omega)+K_S(\Omega)]$, such that $K_M(\Omega)$ is much softer than $K_{SD}(\Omega)$ enabling the use of said simple closed-loop feedback control.

16. An active mount exhibiting an uncontrolled, frequency-dependent dynamic stiffness $K_M(\Omega)$ for reducing mechanical vibration transmitted within a mechanical system which includes said mount, a vibrating device exhibiting a frequency-dependent dynamic stiffness $K_E(\Omega)$ and a support exhibiting a frequency-dependent dynamic stiffness $K_S(\Omega)$, comprising:

(a) a spring means interconnecting said vibrating device and said support for providing passive support of a static load from said vibrating device;

(b) an actuator for providing phased dynamic loads to counteract said mechanical vibration from said vibrating device and reduce vibrating transmitted to said support, said actuator connected in parallel spring relation to said spring means;

(c) a motion sensor collocated with said active mount for supplying an input signal indicative of a magnitude of a movement experienced by said support to a simple closed-loop feedback control system;

(d) said closed-loop feedback control system providing an output control signal to said actuator responsive to said collocated sensor and further including an amplifier which amplifies said input signal, and means for reversing the sign of said input signal; and, (e) said mechanical system being characterized by a ratio of series dynamic stiffness $K_{SD}(\Omega)$ to support stiffness $K_S(\Omega) \geq 2$, for $\Omega > 2f_n$, where $K_{SD}(\Omega) = K_E(\Omega)K_M(\Omega)/[K_E(\Omega)+K_M(\Omega)]$, such that $K_{SD}(\Omega)$ is much softer than $K_{SD}(\Omega)$ enabling the use of said simple closed-loop feedback control.

* * * * *

UNITED STATES PATENT AND TRADEMARK OFFICE
CERTIFICATE OF CORRECTION

PATENT NO. : 5,427,347
DATED : June 27, 1995
INVENTOR(S) : Douglas A. Swanson et al.

It is certified that error appears in the above-indentified patent and that said Letters Patent is hereby corrected as shown below:

Col. 3, line 55, after "schematic", delete ".".

Col. 5, line 6, before "passage", delete "]".

Col. 8, line 55, replace "dosed", with --closed--; line 67, after "into", delete ".".
Col. 9, line 8, replace "illustrators", with --illustrates--.

IN THE CLAIMS    Col. 9, line 58      Col. 9, line 60

Claim 1,    replace "$D_{SD}(\Omega)$", with --$K_{SD}(\Omega)$--;      replace "stiffness", with --stiffnesses--.

Claim 16,    replace "vibrating", with --vibration--;      replace "$K_{SD}(\Omega)$", with --$K_S(\Omega)$--.

Signed and Sealed this

Twenty-sixth Day of September, 1995

Attest:

BRUCE LEHMAN

*Attesting Officer*      *Commissioner of Patents and Trademarks*